United States Patent [19]

Takahashi et al.

[11] 4,126,920
[45] Nov. 28, 1978

[54] SHOCK ABSORBER WITH BEAD-TYPE RETAINER AND METHOD AND APPARATUS FOR THE ASSEMBLY THEREOF

[75] Inventors: Yuji Takahashi, Isehara; Akihiro Shimokura, Higashimine, both of Japan

[73] Assignee: Tokico Ltd., Kanagawa, Japan

[21] Appl. No.: 805,223

[22] Filed: Jun. 9, 1977

Related U.S. Application Data

[63] Continuation-in-part of Ser. No. 641,036, Dec. 15, 1975, abandoned.

[30] Foreign Application Priority Data

Dec. 28, 1974 [JP] Japan .................................. 50-1415

[51] Int. Cl.² .............................................. B23P 11/00
[52] U.S. Cl. .................................................. 29/243.52

[58] Field of Search ................. 29/243.5, 243.52, 520, 29/234, 283.5

[56] References Cited

U.S. PATENT DOCUMENTS

3,345,730  10/1967  Laverty .............................. 29/243.52
3,467,414  9/1969  Downing .............................. 29/520

Primary Examiner—James L. Jones, Jr.
Attorney, Agent, or Firm—Wenderoth, Lind & Ponack

[57] ABSTRACT

A shock absorber includes an outer cylinder and a slidable member fitted in the outer cylinder. The slidable member is inserted into the outer cylinder, and thereafter a beading technique is applied to the outer cylinder so as to form an annular bead on the inner peripheral surface of the outer cylinder for retaining the slidable member within the outer cylinder.

1 Claim, 5 Drawing Figures

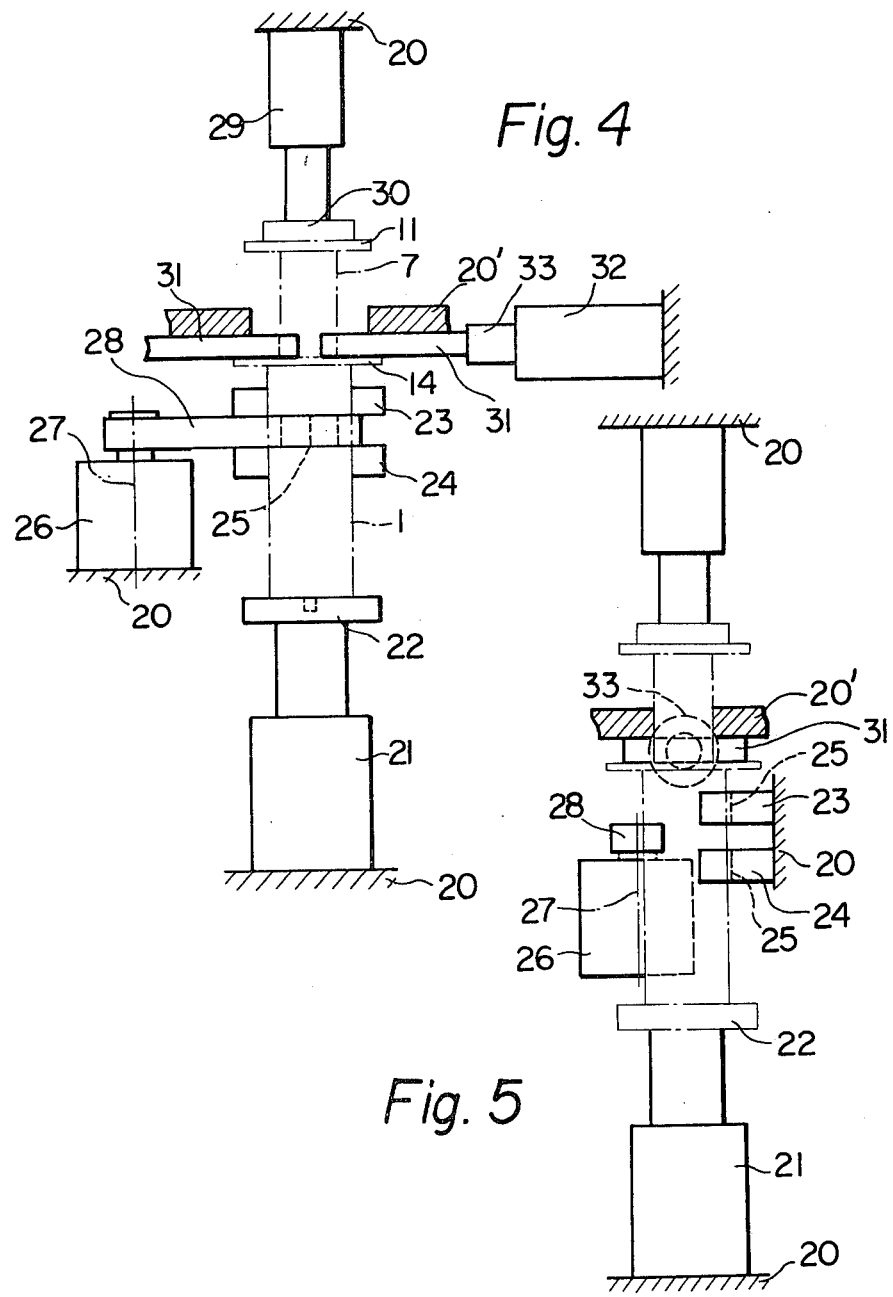

SHOCK ABSORBER WITH BEAD-TYPE RETAINER AND METHOD AND APPARATUS FOR THE ASSEMBLY THEREOF

This a continuation-in-part of application Ser. No. 641,036, filed Dec. 15, 1975, now abandoned.

BACKGROUND OF THE INVENTION

This invention relates to a shock absorber of the energy absorbing type, for example, as provided between the bumper and chassis of a motor vehicle, and including a slidable member such as a piston or a friction member fitted in an outer cylinder for absorbing a shock by means of hydraulic fluid or frictional resistance, and more particularly, to a retainer for retaining the slidable member in the outer cylinder.

According to prior art shock absorbers, for example as shown in German Offenlegungsschrift No. 2,342,033, a slidable member such as a piston slidably inserted in an outer cylinder is retained in the outer cylinder by means of an arcuate retaining ring which engages with an annular groove formed in the inner peripheral surface of the outer cylinder.

However, such a retaining means is complex in construction, and the manufacture of the annular groove and the retaining ring results in the expenditure of substantial time and effort. Furthermore, the annular groove sometimes damages an oil seal fitted on the piston during the assembling operation.

SUMMARY OF THE INVENTION

It is accordingly an object of the present invention to provide a shock absorber which avoids the aforesaid shortcomings experienced with the prior art shock absorber by forming a retaining means in the inner periphery of the outer cylinder according to a press-forming technique.

Another object of the present invention is to provide a novel method and apparatus for performing the press-forming technique, wherein a hydraulic cylinder supports the closed end of the outer cylinder of the shock absorber for pressing it axially, a hydraulically operated clamping device clamps the outer cylinder transversely, a plurality of hydraulically operated cylinders move a plurality of slide plates toward the outer circumference of the inner cylinder, which slide plates are slidably disposed on the transverse surface of a portion of the frame of the apparatus and clamp the outer cylinder axially when the first mentioned cylinder is operated, and a hydraulically operated cylinder acting oppositely with respect to the first mentioned cylinder urges the inner cylinder of the shock absorber into the outer cylinder by a predetermined amount.

BRIEF DESCRIPTION OF THE DRAWINGS

The present invention will be described in more detail with reference to the accompanying drawings exemplifying the present invention, and wherein:

FIG. 4 is a schematic front view of an apparatus for performing a press-forming operation according to the invention to form the annular bead on the inner peripheral surface of the outer cylinder of the shock absorber shown in FIG. 1; and FIG. 5 is a schematic side view of the apparatus of FIG. 4.

DETAILED DESCRIPTION OF THE INVENTION

Figure 1:
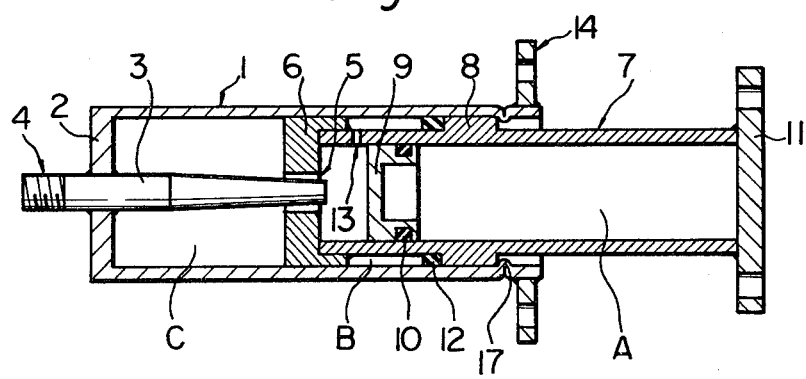
FIG. 1 is a longitudinal cross-sectional view of a shock absorber according to the present invention.

With reference now to FIG. 1, the energy absorbing shock absorber includes an outer cylinder 1 of cylindrical form having a bottom plate 2 forming a closed end. A metering pin 3 extends through the bottom plate 2 at the center thereof and has a tapered tip portion extending into the interior of the outer cylinder 1. The rear end of the metering pin 3 protrudes outwardly from the bottom plate 2 of the outer cylinder 1 and is formed with a threaded portion 4 thereon which is used for securing the shock absorber to, e.g. the chassis or body of a vehicle such as a motor vehicle (not shown). Slidably fitted in the outer cylinder 1 is a piston 6 having an opening 5 at the center thereof. The tapered tip portion of the aforesaid metering pin 3 extends through the opening 5.

A tube or an inner cylinder 7 of cylindrical form has a diameter smaller than that of the outer cylinder 1, and is secured to the piston 6 on the side thereof opposite to the bottom plate 2. An annular projecting portion 8 is formed on the outer peripheral surface of the tube 7. The projecting portion 8 and the piston 6 are slidably located along the inner peripheral surface of the outer cylinder 1 by means of the tube 7. A free piston 9 is slidably fitted in the inner peripheral surface of the tube 7, with a seal ring 10 fitted on the free piston 9. Filled in a space defined by the free piston 9, the inner peripheral wall of the tube 7 and a mounting bracket 11 secured to the outer end of the tube 7 is a high pressure gas. Mounting bracket 11 may be attached to, e.g. the bumper of a motor vehicle (not shown). A seal ring 12 is fitted on the outer periphery of the tube 7 but adjacent to the annular projecting portion 8, so that the seal ring 12 seals off from the atmosphere an oil space B defined by the annular projecting portion 8, the piston 6, the outer peripheral surface of the tube 7 and the inner peripheral surface of the outer cylinder 1. The space B is communicated by way of the opening 5 and a small opening 13 with an oil space C defined by the bottom plate 2, the piston 6 and the inner peripheral surface of the cylinder 1. The spaces B and C are filled with oil. Meanwhile, a mounting bracket 14 is secured to the right-side end of the cylinder 1, as viewed in FIG. 1, to cooperate with the threaded portion 4 for mounting the shock absorber to the chassis or body of the vehicle.

Figure 2:
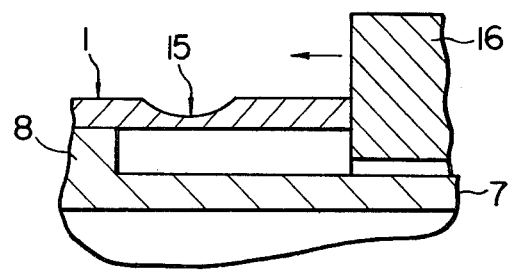
FIG. 2 is a partial enlarged view showing an annular concave portion formed in the outer peripheral surface of an outer cylinder of the shock absorber of FIG. 1.
Figure 3:
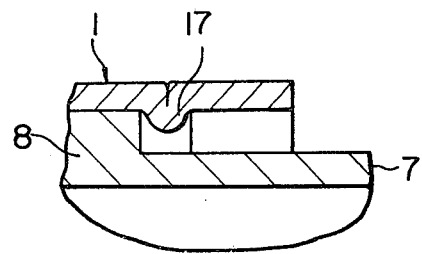
FIG. 3 is a view similar to FIG. 2, but showing an annular bead on the inner peripheral surface of the outer cylinder formed from the annular concave portion of FIG. 2 by pressing the outer cylinder of FIG. 2 axially.

In fabricating the outer cylinder 1, an annular concave portion 15 as shown in FIG. 2 is provided in the outer peripheral surface of the outer cylinder 1 in a position adjacent to the bracket 14. The concave portion 15 is adapted to form an annular bead portion 17, as shown in FIGS. 1 and 3, when the outer cylinder 1 is pressed or compressed axially by means of a press-forming technique. The annular bead portion 17 thus formed can engage with the annular projecting portion 8 of the tube 7, whereby withdrawal of the tube 7 from the outer cylinder 1 is effectively prevented. Shown at 16 in FIG. 2 is a press jig.

The shock absorber shown in FIG. 1 operates in the same manner as the prior art shock absorber shown in the above mentioned German Offenlegungsschrift No. 2,342,033. Specifically, the shock absorber shown in FIG. 1 is attached between two elements which are liable to be subjected to an impact, and the shock absorber of FIG. 1 absorbs the energy of such impact between such two elements. For example, as mentioned above, threaded portion 4 and mounting bracket 14 may be attached to the chassis or body of a motor vehicle, and mounting bracket 11 may be attached to the bumper of such motor vehicle. The shock absorber is intended to absorb the shock of an impact that would occur if the motor vehicle collides with another vehicle or object. That is, the shock absorber of the present invention is not operated during normal conditions, but operates only as a safety or emergency device during a collision.

It is believed that those skilled in the art will understand how the shock absorber shown in FIG. 1 operates during a collision. Briefly, upon a collision of the vehicle with another object, mounting bracket 11, for example attached to the bumper of the motor vehicle, is subjected to an external impact or shock which causes tube 7 to be pressed into outer cylinder 1. This intensifies the pressure of the oil existing in chamber C and causes the oil to flow from chamber C through outlet opening 5 into the chamber to the immediate left of free piston 9 as shown in FIG. 1. This causes free piston 9 to be shifted rightwardly so that the volume of chamber A is reduced. The small space formed by opening 5 between metering pin 3 and piston 6 acts to damp the impact force. Metering pin 3 is tapered such that the free space or passage between the metering pin 3 and the surface of piston 6 formed by opening 5 reduces when the piston 6 and tube 7 are displaced inwardly of outer cylinder 1. This provides a substantially constant damping force as a function of decreasing velocity. Oil pressure in the chamber to the immediate left of free piston 9 as shown in FIG. 1 displaces free piston 9 to the right into tube 7, as mentioned above, and this increases the gas pressure within chamber A. This increased gas pressure reacts to increase the oil pressure, and this increased oil pressure communicates through orifice 13 into chamber B to press seal ring 12.

The above operation is conventional and will be understood by those skilled in the art.

The above description regarding the operation of the shock absorber shown in FIG. 1 is made with reference to the shock absorber being attached between the bumper and chassis of a motor vehicle. It will however be understood by those skilled in the art that the shock absorber of the present invention may be employed for other purposes and between other elements, when it is desired to absorb a potential impact or shock.

However, the shock absorber of the present invention is unique in the configuration of annular bead portion 17 which retains the tube 7 within the outer cylinder 1.

As is apparent from the foregoing description, by forming an annular concave portion at a desired position in the outer peripheral surface of the outer cylinder 1, and by pressing the outer cylinder axially, an annular bead can be easily formed on the inner peripheral surface of the outer cylinder 1. In other words, the annular bead is formed according to a beading technique, so that the assembling operation of the shock absorber may be remarkably simplified as compared with the prior art assembling operation including manufacture of a retaining ring and a retaining ring receiving groove formed in the inner peripheral surface of the outer cylinder.

Further, it is to be understood that the novel bead-type retainer of the invention can be adapted to various internal constructions of shock absorbers other than the type shown in FIG. 1.

FIGS. 4 and 5 are schematic views of an apparatus adapted to form the annular bead 17 on the inner peripheral surface of the outer cylinder 1.

The shock absorber including the outer cylinder 1 and the inner tube 7 shown by the chain lines is located on a ram 22 of a hydraulic cylinder 21 such that the closed end of the cylinder 1 engages with the ram 22. The side wall or the outer peripheral surface of the cylinder 1 is clamped between a set of supporting members 23 and 24 and an arm 28 which is rotatably mounted around a shaft or an axis 27 of a hydraulic motor 26. A V-shaped groove or notch 25 is formed on each of the supporting members 23 and 24 and the arm 28, so that the shock absorber is clamped in a position axially aligned with respect to the hydraulic cylinder 21 when the arm 28 is operated by the hydraulic motor 26 and urged toward the supporting members 23 and 24. A hydraulic cylinder 29 is positioned opposing the hydraulic cylinder 21 for urging the inner tube 7 and the piston 6 attached thereto into the cylinder 1.

A pair of slide plates 31 are slidably disposed on a frame 20' which constitutes a portion of a frame or a rigid body portion 20 of the apparatus. Each of the slide plates 31 is connected to a ram 33 of a transversely acting hydraulic cylinder 32. A semi-circular shaped recess (not shown) is formed in the free end of each of the slide plates 31 such that when the hydraulic cylinders 32 are operated the slide plates 31 move toward each other and engage with the outer circumference of the inner tube 7, and receive the axial upward force transmitted through the outer cylinder 1 when the hydraulic cylinder 21 is operated.

Preferably, the hydraulic cylinders 26, 29 and 32 are operated pneumatically, and the hydraulic cylinder 21 is operated by high pressure liquid.

In operation, the outer cylinder 1 incorporating the metering pin 3 and containing oil therein is preassembled with the inner tube 7 incorporating the piston 6, the free piston 9 and the oil seal 10 and containing high pressure gas enclosed therein. The preassembly comprising the outer cylinder 1 and the tube 7 is positioned on the ram 22 of the hydraulic cylinder 21. By operating the hydraulic motor 26, the outer circumference of the outer cylinder 1 is clamped between the arm 28 of the hydraulic motor 26 and the supporting members 23 and 24. The hydraulic cylinder 29 is operated for pressing tube 7 into the outer cylinder 1 by a suitable amount such that the piston 8 is positioned below the concave portion 15. Then, the transverse cylinders 32, 32 are pressurized, and the slide plates 31, 31 are moved toward each other and engage with the outer periphery of the tube 7. The hydraulic cylinder 21 is operated slowly for clamping the outer cylinder 1 axially between the ram 22 of the cylinder 21 and the lower surfaces of the slide plates 31, 31 which, in turn, are urged against the frame portions 20', 20'.

Thereafter, high pressure liquid is introduced into the hydraulic cylinder 21 so as to compress the outer cylinder 1 of the shock absorber axially, whereby the concave portion 15 is deformed to form the bead portion 17.

The hydraulic cylinders 21, 26, 29, 32 and 32 are deenergized and the shock absorber is released from the apparatus.

As described above, the apparatus shown in the drawings makes it possible to form the bead portion 17 on the inner circumference of the outer cylinder 1 and to finally assemble the shock absorber very easily and quickly.

It is to be understood that various modifications may be made to the above specifically described structural arrangements and process operations without departing from the scope of the present invention. Specifically, as stated above, the overall shock absorber configuration may be different from that specifically shown in FIG. 1 of the drawings, with the bead portion 17 being formed in an outer cylinder for retaining therein an inner movable cylinder or piston. Furthermore, the bead portion 17 may be formed by a process and apparatus other than that specifically described with regard to FIGS. 4 and 5 of the drawings, the important feature being however that the outer cylinder 1 have formed in the outer periphery thereof an annular recess and that the outer cylinder then be axially compressed to deform the reduced thickness portion radially inwardly to form the annular bead.

What is claimed is:

1. An apparatus for assembling a shock absorber of the type including an outer cylinder having a closed end and an open end and a slidable member extending through said open end of said outer cylinder, said slidable member having an annular portion projecting outwardly from the periphery thereof in sliding contact with said outer cylinder, said outer cylinder having a reduced thickness portion formed by an annular concave recess in the outer peripheral surface thereof at a position adjacent said open end thereof, such that said slidable member is retained within said outer cylinder, said apparatus comprising:

first cylinder means for supporting said closed end of said outer cylinder and for selectively urging said outer cylinder axially;

first clamping means for selectively clamping the outer peripheral surface of said outer cylinder to prevent lateral movement thereof;

second clamping means for selectively contacting said open end of said outer cylinder and for thus clamping said outer cylinder against said first cylinder means;

second cylinder means for selectively contacting said slidable member and urging said slidable member toward said outer cylinder to a position such that said annular projecting portion is between said closed end and said reduced thickness portion of said outer cylinder, said first cylinder means being operable when said slidable member is so positioned to urge said outer cylinder axially toward said second clamping means, thereby axially compressing said outer cylinder and deforming said reduced thickness portion inwardly and forming an annular bead extending into the interior of said outer cylinder.

* * * * *